April 26, 1938.   C. E. HATHORN ET AL   2,115,165
TANK CONSTRUCTION
Filed June 13, 1934
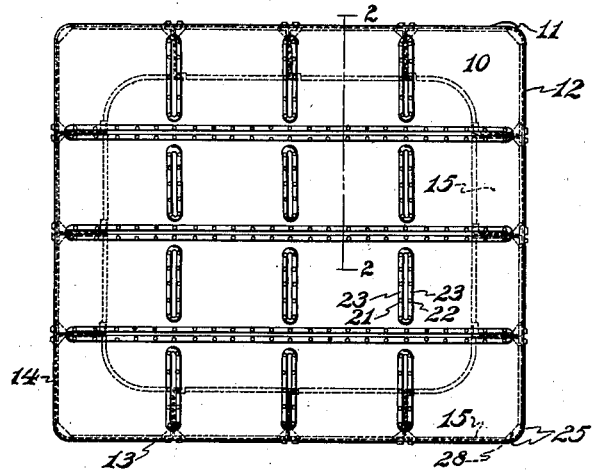
FIG.1.
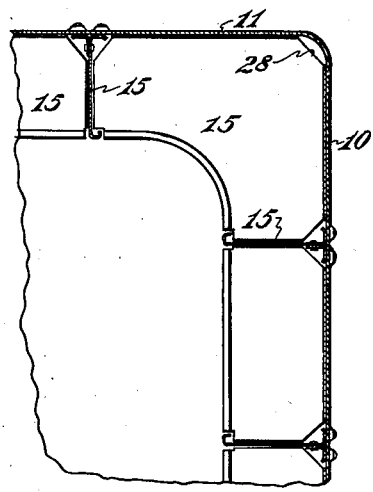
FIG.2.
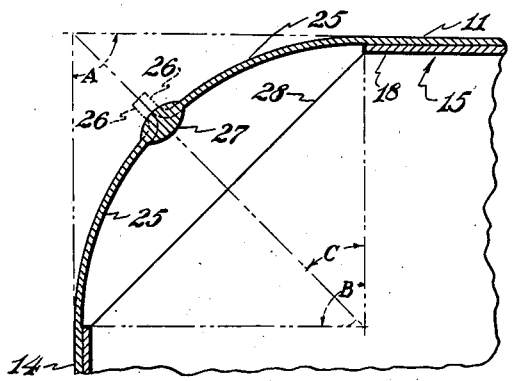
FIG.3.
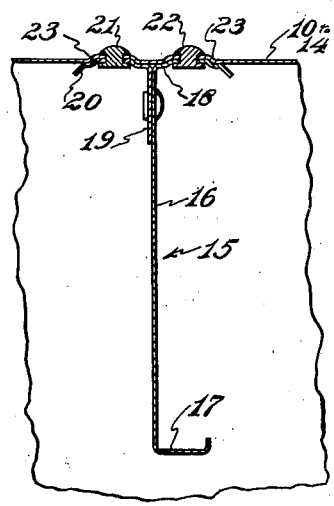
FIG.4.
FIG.5.
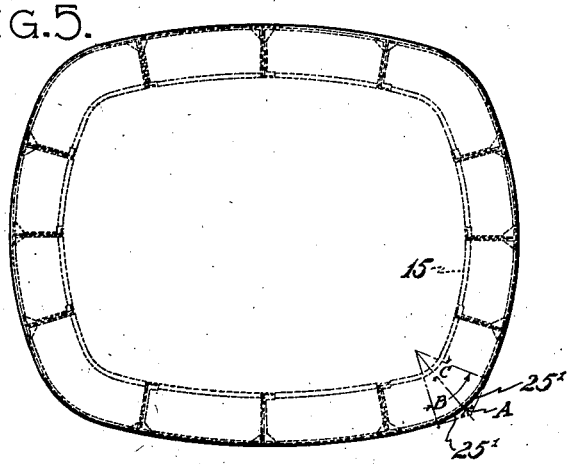
INVENTORS
CHARLES E. HATHORN
and JOHN W. DUNN
BY
ATTORNEYS.

Patented Apr. 26, 1938

2,115,165

UNITED STATES PATENT OFFICE 2,115,165

TANK CONSTRUCTION

Charles E. Hathorn, Kenmore, and John W. Dunn, Buffalo, N. Y., assignors, by mesne assignments, to Curtiss-Wright Corporation, a corporation of New York Application June 13, 1934, Serial No. 730,384

2 Claims. (Cl. 220—71)

This invention relates to tank construction, and is particularly concerned with improvements in the method of fabricating fuel and oil tanks and the like for aircraft.

In the past, fuel or oil tanks for aircraft have usually been constructed from sheet brass, terne-plate or other thin materials, the joints in the tank usually being riveted and subsequently soldered for tightness. As more powerful power plants were developed, and as the size of aircraft increased, more fuel naturally had to be carried. The continuance of the use of such heavy materials as brass and terne-plate was objectionable due to the weight. Therefore, the use of aluminum and aluminum alloys was adopted. The aluminum alloys, as is well known, cannot be satisfactorily welded, since the mechanical properties of the material are reduced by the application of intense heat. Aluminum alloy tanks, then, were usually riveted and various types of riveted joints have been evolved therefor. Sheet aluminum tanks could be welded. In the construction of tanks, however, certain problems arise in that where the corner joints of the tank are relatively sharp, the vibration to which they are subjected causes cracking and leaks. Likewise, the flat surfaces of the tank faces are subject to "panting", which causes their eventual failure.

Baffles in previous tank constructions have usually extended in egg-crate fashion throughout the interior of the tank, the various baffling elements being riveted together. The construction of a riveted tank having such baffling therewithin is very difficult, as there is a low degree of accessibility for driving the rivets.

The present tank construction combines a form of monocoque construction along with improved types of welded corner joints. The tank generally comprises a hollow skeleton framework of crossed elements which form baffles as well as reinforcements for the covering sheets of the tank. To this skeleton, the tank covering is riveted by aluminum rivets which may be fused into the tank covering to form a liquid-tight joint. The borders of the covering plates are formed on a curve to provide a relatively generous fillet, the edge of each plate then being upset to form a flange. As the cover plates are assembled, these flanges abut one another, after which the flanges are fused together to form a welded joint between the edges of adjacent plates. The ultimate result, then, is a filleted corner for the tank which resists fatigue and failure.

Objects of the invention are to provide an improved tank construction, to provide a monocoque tank construction, to provide a relatively light, hollow skeleton upon which the covering plates may be attached, and to provide an improved form of joint for the covering plates.

Further objects will become apparent in reading the specification and claims, and in examining the drawing, in which:

Fig. 1 is a plan of the tank of this invention;
Fig. 2 is a section on the line 2—2 of Fig. 1;
Fig. 3 is an enlarged section through the joint between adjacent covering plates, showing the initial assembly prior to welding, in dotted lines;
Fig. 4 is an enlarged section through a portion of the tank covering plate and one of the bracing members; and
Fig. 5 is an elevation of an alternative form of tank.

The tank comprises a plurality of cover plates 10, 11, 12, 13, and 14 joined at their corners in a manner hereinafter to be described. Within the covering, a plurality of brace members 15 are arranged, certain of these members running continuously throughout the periphery of the tank in one plane, and certain other of these members abutting the first mentioned members at right angles and extending from one to the other of the first members. Thereby, a honeycomb skeleton is formed, each bracing member 15 being substantially identical in cross section with the others, Fig. 4 indicating this conformation. Each member 15 comprises a channel element having a web 16, an inner reinforcing flange 17 and an outer flange 18. An angle element 19 is riveted to the web 16, the other wing of the angle forming a flange 20 lying in the plane of the flange 18. The tank covering plate 10 or the like, overlies the flanges 20 and 18, each said flange being riveted to the cover plate by rivets 21 and 22. These rivets may be staggered, or may be in side by side relationship as shown in Fig. 1, and the portions of the cover plates and flanges along which the rivets 21 and 22 are located may be slightly upset as at 23 to form a reinforcing bead on the rivet line. Fig. 1 indicates how certain of the reinforcing elements 15 extend laterally across the span of the tank, these elements being in parallel spaced relationship, while the vertical elements 15 extend also in parallel spaced relationship between the horizontal elements. In the actual fabrication of the tank, the long reinforcing elements 15 would be successively attached to the several cover plates 10 to 14, inclusive, after which the short bracing elements 15 are attached thereto between the first attached elements. It will be noted that upon ultimate assembly of the elements 15 with the cover plates, that the tank bracing forms a crossed honeycomb effect close to the inner surface of the tank, this bracing leaving almost the entire inside of the tank free and clear. This large open space permits easy assembly of the various elements—all but one cover plate of the tank may be readily assembled, there being ample room within the partially completed open tank for attachment of rivets and assembly of the bracing elements. On the last plate of the tank to be applied to the structure, the short elements 15 may be attached to said plate whereupon the plate may be placed upon the already formed skeleton. Thereupon, the final riveting of the last cover plate to the bracing elements 15 may be effected.

After such assembly, the corners of the cover plates may be welded, as will now be described. The border 25 of each cover plate prior to assembly is curved toward an adjacent plate and the edge 26 thereof is bent at right angles to the adjacent plate portion, providing a flange. The curved portions 25 of adjacent plates are so fitted that when the cover plates are assembled, the inner surfaces of the flanges 26 abut one another. Thereupon, the adjacent flanges 26 may be readily fused with a welding torch to form a continuous bead 27, making a fluid-tight joint. It will be noted that the border portions 25 of the adjacent cover plates extend on opposite sides of the bead 27, so that the stresses to which one said border portion is subjected will be evenly carried through to the adjacent border portion, thus reducing the likelihood of failure at the weld. It will be noted that the bracing elements 15 which lie at the corners of the tank are attached to adjacent cover plates, and a cut-out 28 is made at the corner whereby gasoline may flow from one compartment to another in the bracing. Similarly, the corners of the brace members 15 adjacent the bracing flanges 18 and 20 of the alternate members 15 are cut away to allow flow of liquid between the bracing compartments.

It will be noted that in the geometrical construction of the corners, as shown in Fig. 3, the cover plates 11 and 14, for instance, make an angle A with respect to each other, which may be a right angle or any other angle. To properly form the borders 25 so that their edges lie adjacent and contiguous, each border portion must necessarily subtend an angle C which is half of the supplement B of the angle A. In other words, the angles A and B are supplementary, while the angle C is half of the angle B.

Fig. 5 shows an alternative form of tank wherein the cover plates are curved to avoid flat surfaces and thus to avoid panting of the tank faces with possible failure thereof. The corners of the tank are joined in a manner similar to that shown in Fig. 3, and the angle relationships of the arc subtended by the border portions 25 follows the same method as outlined above. In Fig. 5, the angle A represents the included angle between the main portions of the cover plates. The angle B is the supplement of the angle A. The arc subtended by the border portion 25 of each cover plate is then represented by the angle C which is half of the angle B. In the construction shown in Fig. 5, the same method of welding would preferably be followed.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In a tank construction, a pair of side plates in angled relation having their meeting edge portions curved inwardly so that the extreme edges abut in coplanar relationship, a weld seam formed along said edges by which said plates are joined, and a cellular brace structure within said tank attached to said tank plates, said structure being relieved from contact with said plates at the curved edge portions thereof.

2. In a substantially rectangular tank, adjacent side plates angled relative to one another, said plates being curved at their borders to abut in substantially coplanar relationship at their edges, a weld joining said plates comprising a weld bead of substantially oval form in section from which the plate borders extend at opposite ends of the oval, whereby eccentric and offset stress in the joint is avoided, and bracing means for said plates comprising a gusset member in contact with the adjacent plates except at the curved borders thereof, said member being attached to the respective plates, said gusset, by its clearance relative to the curved plate borders, permitting the latter to assume positions, when the tank is loaded, free from extraneous stresses other than tension.

CHARLES E. HATHORN.
JOHN W. DUNN.